(12) United States Patent
Peters

(10) Patent No.: US 8,800,464 B1
(45) Date of Patent: Aug. 12, 2014

(54) STABILIZED STEP HULL UTILIZING A VENTILATED TUNNEL

(71) Applicant: Michael Paul Peters, Sarasota, FL (US)

(72) Inventor: Michael Paul Peters, Sarasota, FL (US)

( * ) Notice: Subject to any disclaimer, the term of this patent is extended or adjusted under 35 U.S.C. 154(b) by 0 days.

(21) Appl. No.: 13/658,305

(22) Filed: Oct. 23, 2012

Related U.S. Application Data

(63) Continuation of application No. 12/031,354, filed on Feb. 14, 2008, now Pat. No. 8,291,850.

(60) Provisional application No. 60/904,811, filed on Mar. 5, 2007.

(51) Int. Cl.
*B63B 1/38* (2006.01)
*B63B 1/32* (2006.01)

(52) U.S. Cl.
CPC ........................................ *B63B 1/32* (2013.01)
USPC ......................................................... 114/289

(58) Field of Classification Search
USPC ............ 440/68–70; D12/310–313; 114/67 A, 114/288–291
See application file for complete search history.

(56) References Cited

U.S. PATENT DOCUMENTS

| | | | | |
|---|---|---|---|---|
| 1,831,339 A | * | 11/1931 | Brush | 114/289 |
| 3,937,173 A | * | 2/1976 | Stuart | 440/69 |
| 4,903,626 A | * | 2/1990 | Haines | 114/291 |
| 2005/0160960 A1 | * | 7/2005 | Batista et al. | 114/274 |
| 2007/0245944 A1 | * | 10/2007 | Scism et al. | 114/288 |

* cited by examiner

*Primary Examiner* — Edwin Swinehart
(74) *Attorney, Agent, or Firm* — Allen, Dyer, Doppelt, Milbrath & Gilchrist, P.A.

(57) ABSTRACT

A high speed powerboat hull (100) incorporating a tunnel ventilation channel (154) spanning between a starboard (160) and port (162) side of the hull (100). The hull (100) has a "V" shaped forward section. The ventilated tunnel (150) is provided as a recess having two substantially vertical sidewalls (152) arranged parallel to each other located along each of the two outer edges of the tunnel (150). The tunnel (150) is disposed longitudinally between the ventilated channel (154) and a transom (112). The ventilated tunnel (150) is in fluid communication with the ventilation channel (154). The hull (100) can further comprise at least one stepped hull section (122, 126).

2 Claims, 10 Drawing Sheets

STABILIZED STEP HULL UTILIZING A VENTILATED TUNNEL

CROSS-REFERENCE TO RELATED APPLICATIONS

This is a continuation of application Ser. No. 12/031,354, filed Feb. 14, 2008, now U.S. Pat. No. 8,291,850, which claims the benefit of U.S. Provisional Application No. 60/904,811, filed Mar. 5, 2007.

BACKGROUND OF THE INVENTION

1. Field of the Invention

The invention relates generally to an improved planing hull design for a power boat and, more specifically, to a high speed power boat having an improved hull design shape including a tunnel section that is positioned center and aft of an at least one transverse step.

2. Discussion of the Related Art

High speed powerboats utilize various design features for speed and stability. Powerboats utilize planing to reduce displacement and the resulting friction/wave resistance resulting in an increase in speed. Offshore powerboats require additional features to ensure stability while running at high speeds over a rough water surface.

Planing refers to the hydrodynamic process whereas, on increasing speed, the boat is lifted up relative to the water surface by dynamic pressure acting over the surface of the boat hull bottom. This dynamic pressure is a function of increasing boat speed. At rest, the boat is supported (floats) by pressure provided by hydrostatic forces, resulting in the boat being positioned deeper in the water thereby displacing a larger water volume than when planing.

Conflicting conditions of operation exist with the typical planning craft:

1. Displacement (low speed) mode, requiring relatively large displaced volume and larger wetted surface area, and
2. Planing (high speed) mode, requiring relatively small displacement and smaller wetted surface area.

The conflict is that, in order to have the area needed for displacement operation, excessive area and its accompanying excessive drag tend to occur in high speed planing operation.

Modern planing craft resolve this conflict to some degree by the use of lifting strakes, stepped hulls, chines, and/or combinations thereof. All three of the hull form modifications shown function to separate the flow in steady planing (as well as in seaway slamming) to produce a smaller area for reduced planing resistance (and impact acceleration).

Another known design for increasing speed of a powerboat is the incorporation of transverse ventilation steps. When a boat is traveling at high speeds, suction is created between the contacting surface area of the hull and the surface of the water. These ventilation steps provide a channel for releasing the created suction. By reducing the suction, the ventilation steps introduce another issue, as the directional stability is compromised.

What is desired is a boat hull comprising features that reduce the amount of drag, while maintaining or increasing directional stability and control. The present invention overcomes the prior art deficiencies, providing a novel design that increases directional stability while maintaining features which relieve hull suction which are not apparent, obvious, or suggested, either directly or indirectly by the known art.

SUMMARY OF THE INVENTION

In view of the limitations presented in the background herein, the present invention provides a novel design, which maintains, and more likely reduces, the amount of drag, while improving directional stability and control. The design features additionally simplify the construction and are more versatile in operation than other previously known hull designs The planing boat hull of the present invention includes a bow, a transom, a keel, and an underside having at least one transverse step that extends at least partially the width of the underside. Ventilation is provided via channels formed transversely along the steps, the channels provide a means for introducing airflow reducing the suction created via a planing hull.

One aspect of the present invention is to provide a novel ventilated tunnel feature that results in an increased directional stability, which is not apparent, obvious, or suggested, either directly or indirectly by any of the prior known designs.

In addition to the venting means, the present invention incorporates a tunnel section in the bottom of the hull, extending longitudinally from the at least one transverse step aft to the transom. In a preferred embodiment, the tunnel section begins at the rear most transverse step. The ventilation of the tunnel and transverse steps relieves suction, while the substantially vertical sidewalls of the tunnel act as an inverted keel, improving the directional stability of the vessel. A channel is provided from the leading edge of the tunnel transversing the hull outward extending beyond the water-hull interface.

The remainder of the hull underside is preferably corrugated having a plurality of lift strakes on each side of the keel. Preferably 2-4 planing strakes are provided on each side of the keel wherein an outermost planing strake may terminate at or adjacent each transverse step, the transom, or any intermediate point along the hull.

There also may be provided venting means communicating with atmosphere above the waterline, which is associated with the aforementioned transverse step. In operation the recess has a base surface or undersurface which functions as a reduced pressure area and thus avoids water turbulence. The purpose of the venting means is to facilitate the breakage of the aforementioned seal or suction created by water flow when the hull is attempting to plane by allowing the ingress of air to water located below the recess.

The venting means may be of any suitable type. In one embodiment the venting means may comprise a conduit or aperture communicating with the undersurface of the recess. Preferably, the conduit or aperture is substantially vertically oriented and communicates with the interior of the hull.

In another embodiment the venting means may comprise a slot or groove located in the underside of the recess, which communicates with air above the waterline so as to break the aforesaid suction or seal. Preferably the ventilation slot or groove is oriented transversely to the longitudinal axis of the hull or the keel.

In another aspect of the present invention, the hull can further comprise a motor mount that is contiguous with the hull, the motor mount extending to the aft of the transom.

In yet another aspect, the trim tab receiving section is incorporated as a recession into the bottom portion of the motor mount.

A benefit of the present invention is improved directional stability, the directional stability being improved via the tunnel vertical sidewalls acting as an inverted keel.

Yet another benefit of the present invention is an improved efficiency, reducing drag by providing dynamic lift within the tunnel section.

And yet another benefit provided is an improved sea keeping capability as well as increased safety and universal functionality of the hull compared to currently available hull designs.

An additional benefit of the tunnel section is an improved water flow towards propellers installed proximate the hulls longitudinal centerline (keel).

The foregoing has outlined, in general, the physical aspects of the invention and is to serve as an aid in better understanding the more complete detailed description that is presented herein. In reference to such, there is to be a clear understanding that the present invention is not limited to the method or detail of construction, fabrication, material, or application of use described and illustrated herein. Any other variation of fabrication, use, or application should be considered apparent as an alternate embodiment of the present invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs., in which.

DETAILED DESCRIPTION OF REPRESENTATIVE EMBODIMENTS

Figure 1:
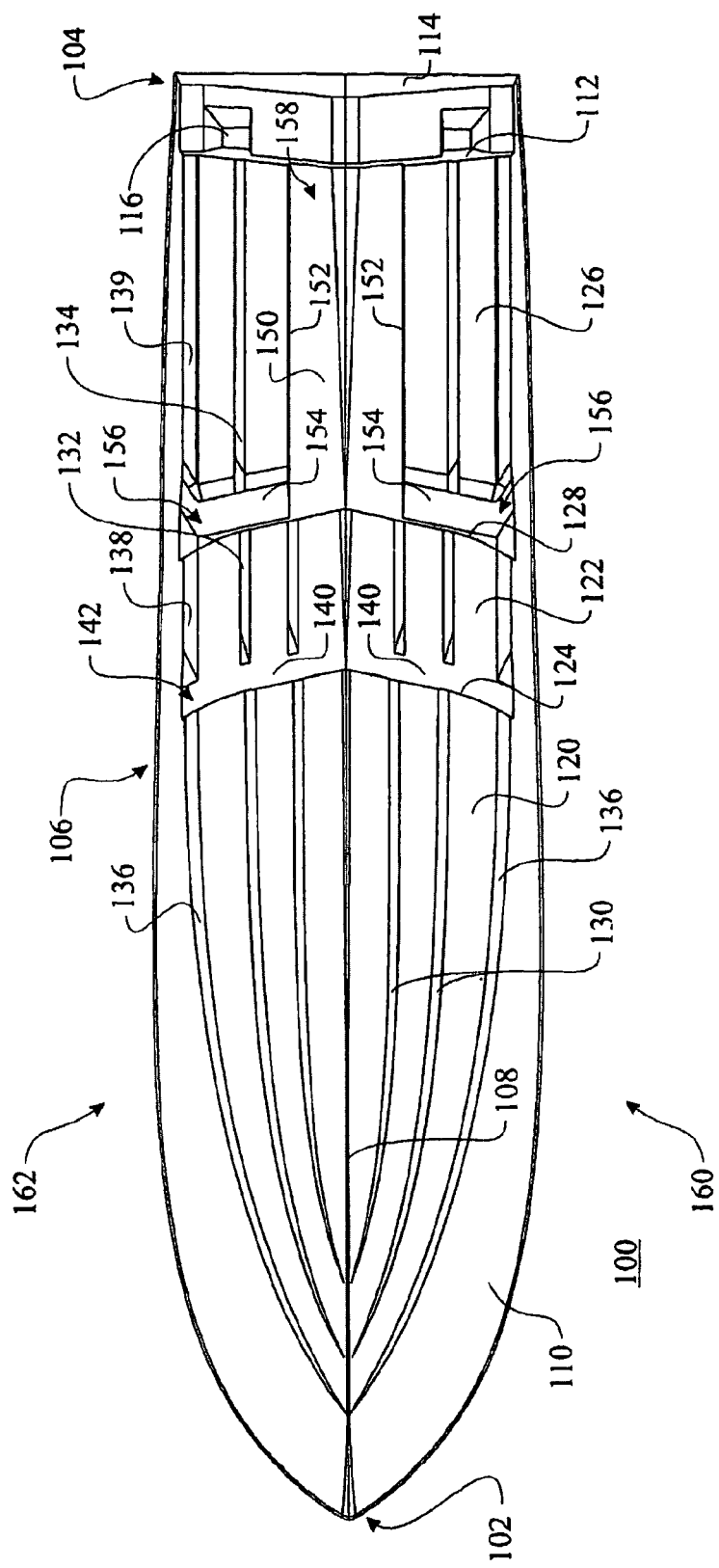
FIG. 1 presents a bottom view of a powerboat hull presenting an exemplary embodiment of the present invention.
Figure 2:
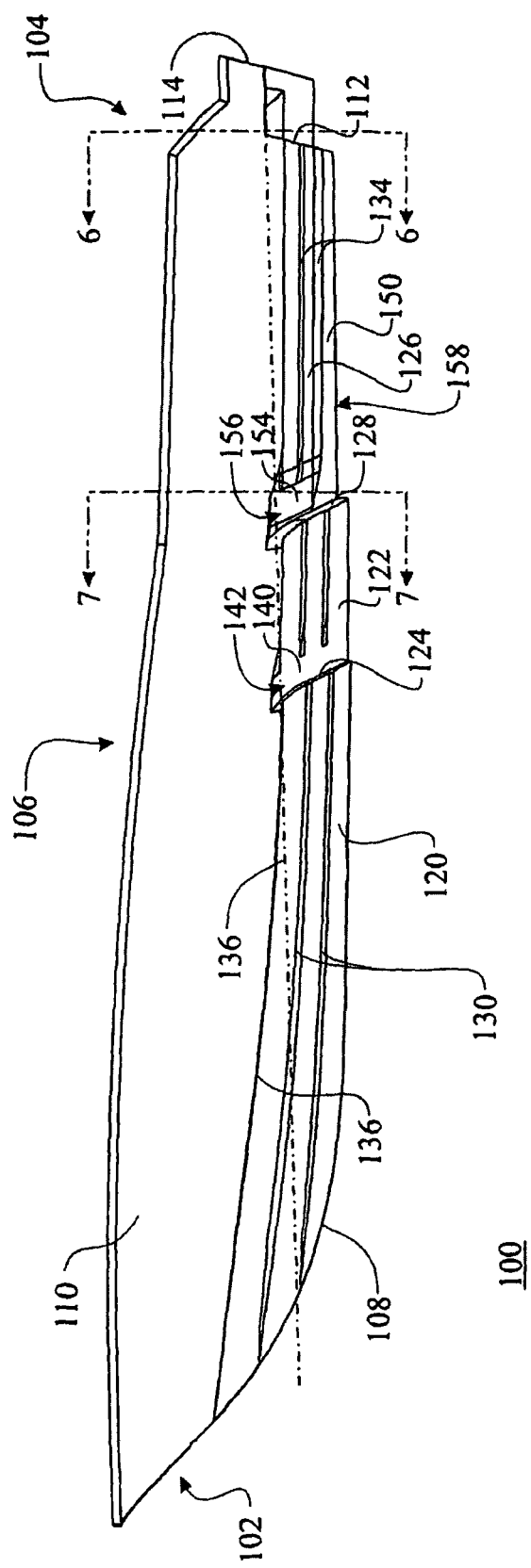
FIG. 2 presents an elevation view of the powerboat hull of FIG. 1.
Figure 3:
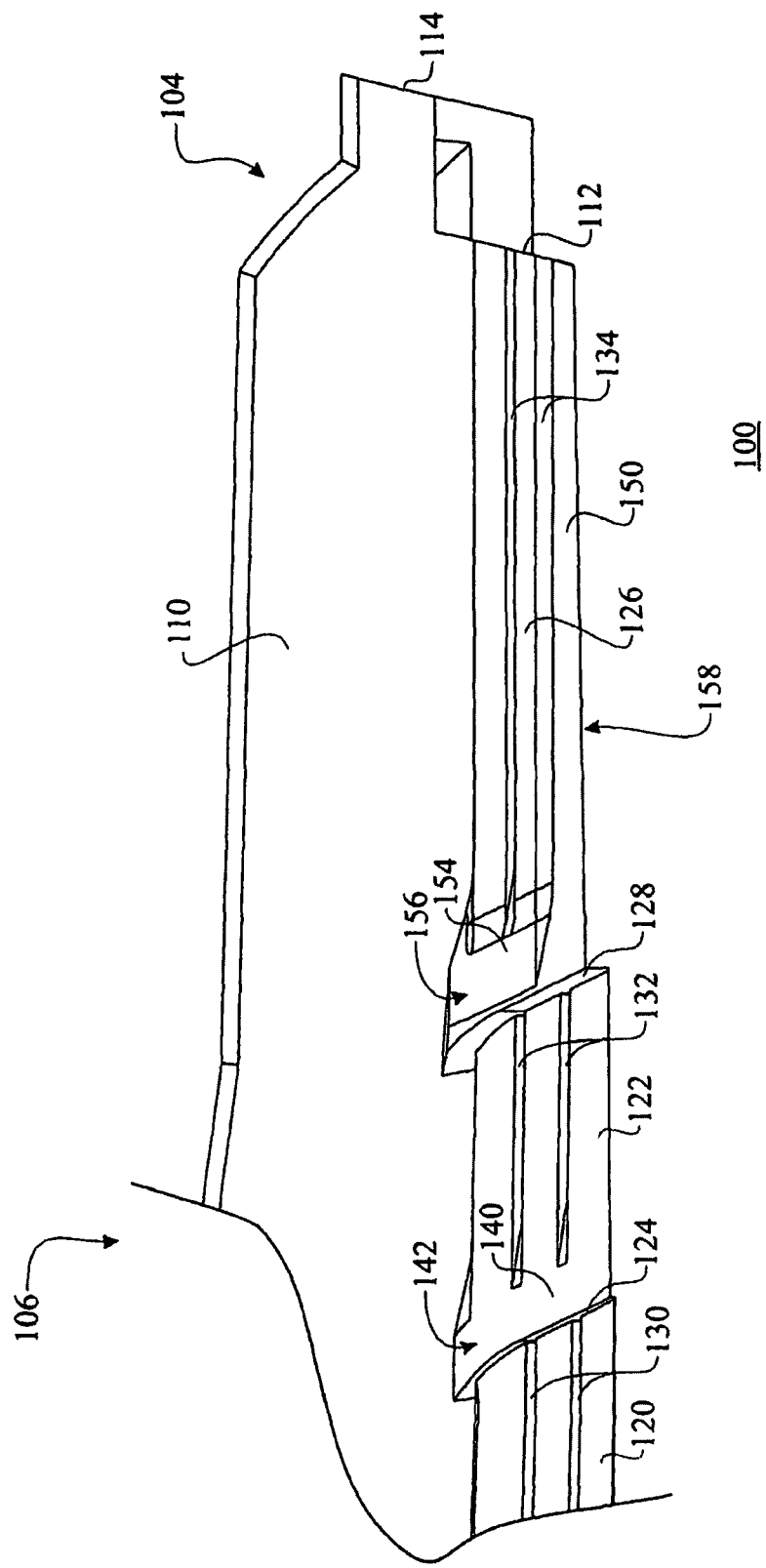
FIG. 3 presents a magnified elevation view of the aft portion of the powerboat hull of FIG. 1.
Figure 4:
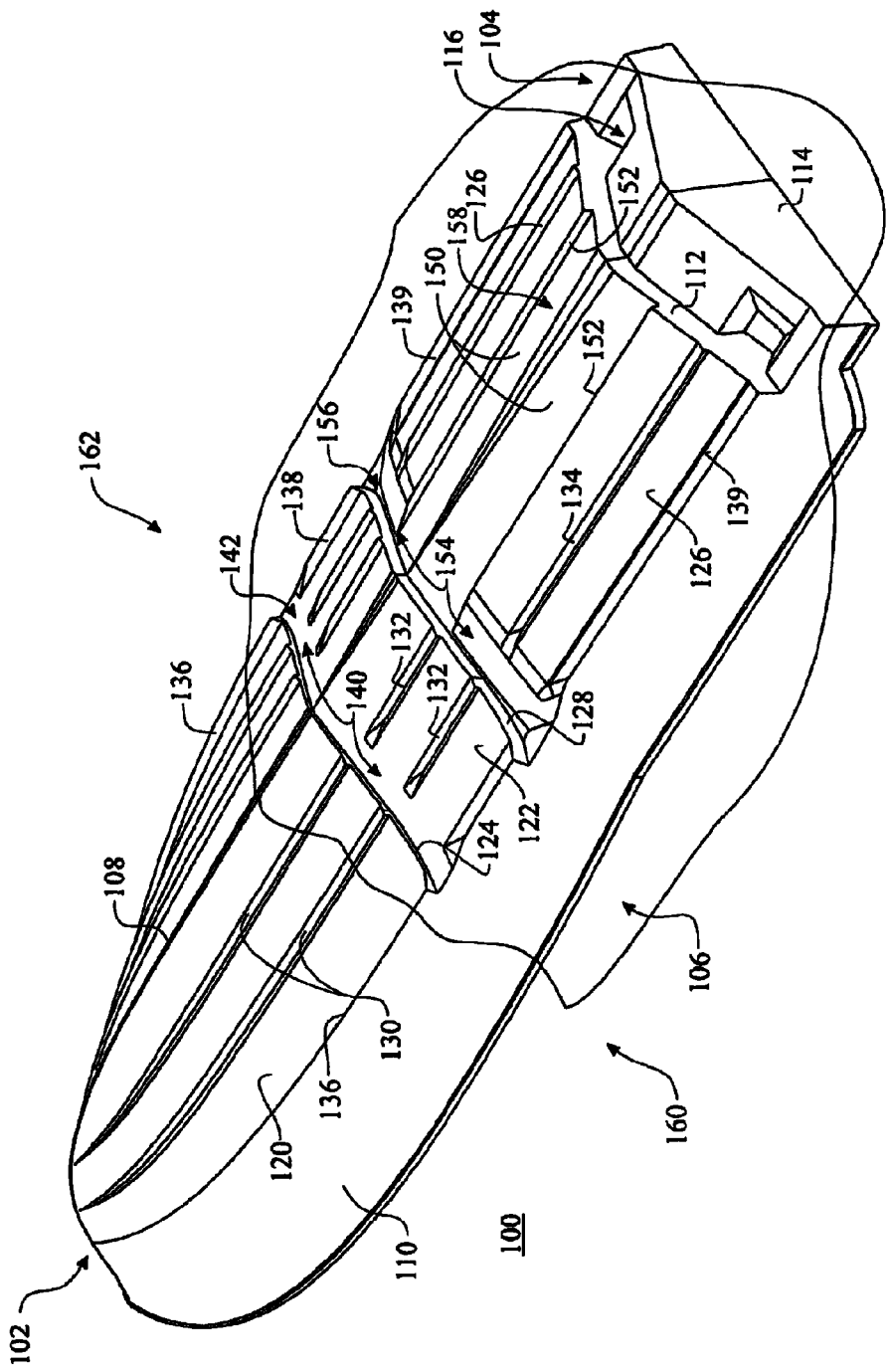
FIG. 4 presents an isometric view of bottom of the powerboat hull of FIG. 1.
Figure 5:
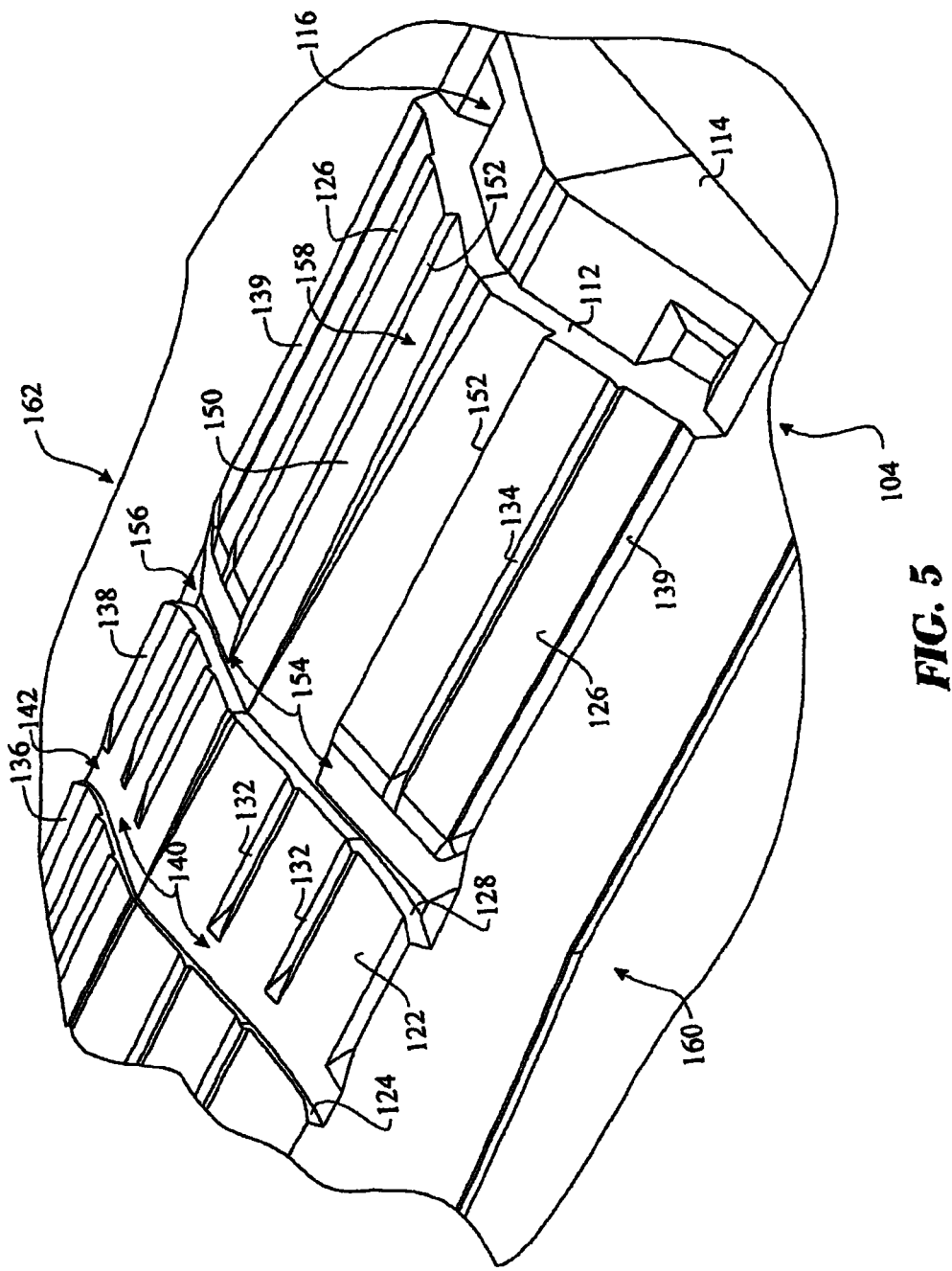
FIG. 5 presents a magnified isometric view of the aft portion of the bottom of the powerboat hull of FIG. 1.
Figure 6:
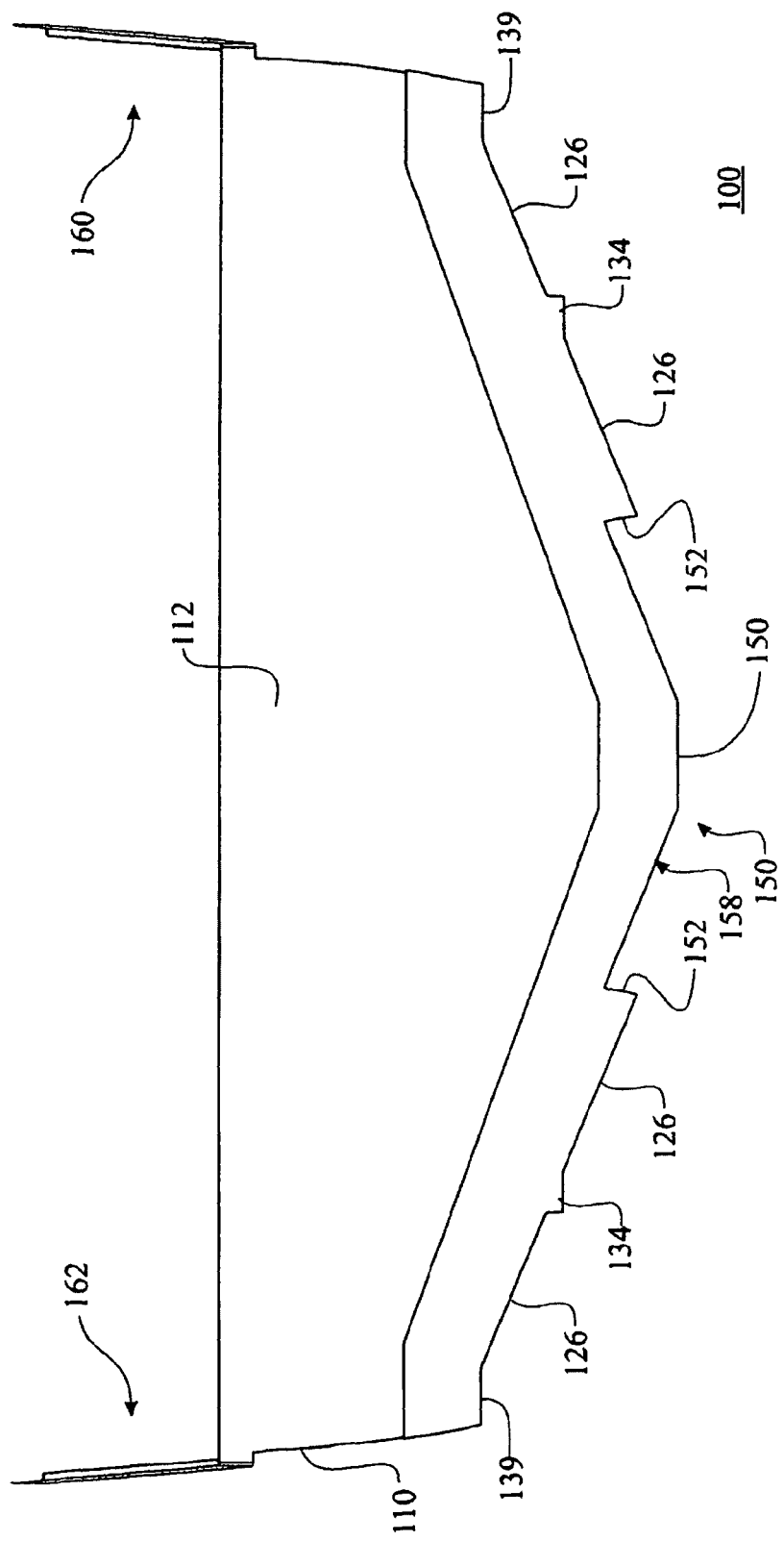
FIG. 6 presents an forward facing view sectioned at the transom of the powerboat hull.
Figure 7:
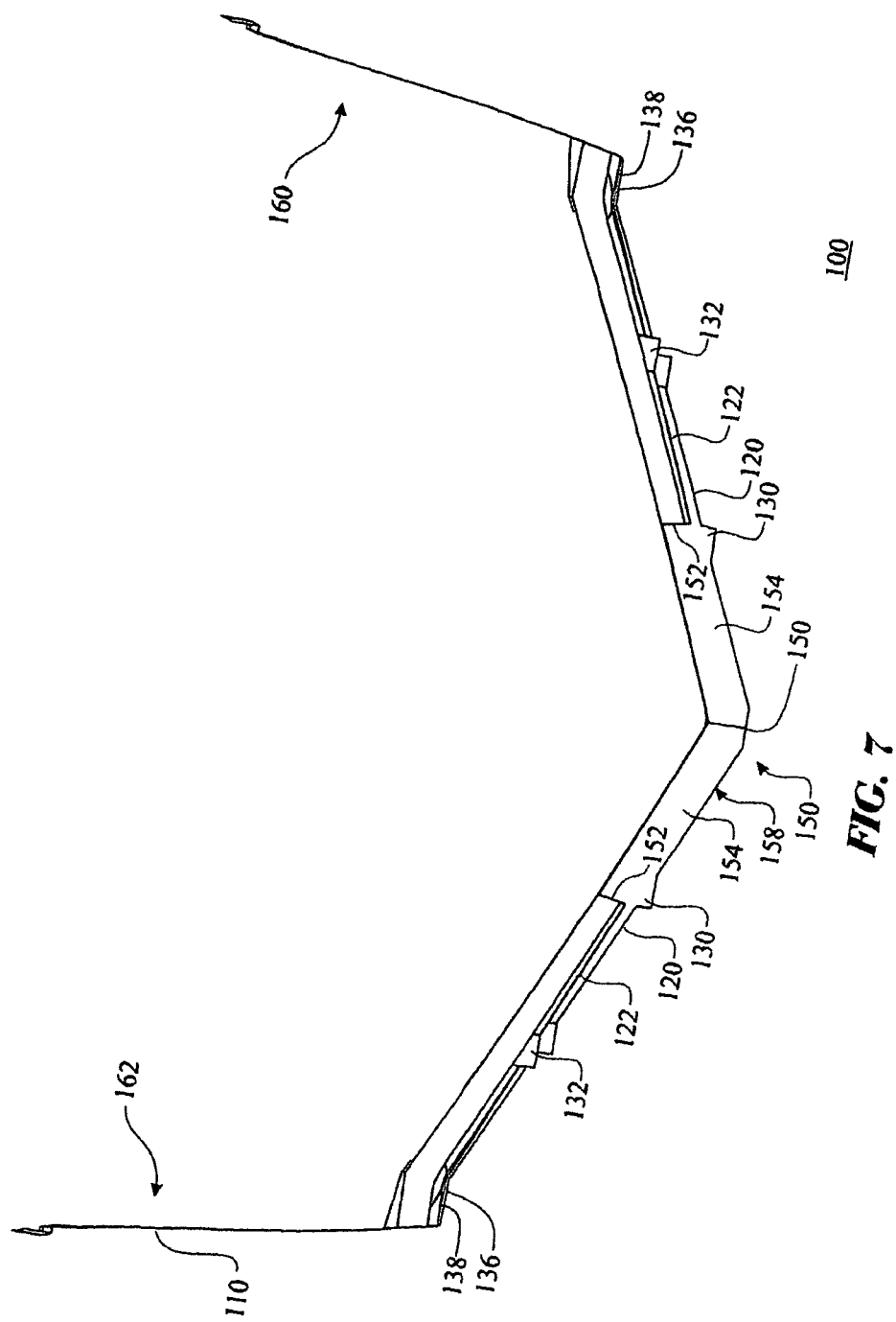
FIG. 7 presents a forward facing view sectioned at the leading edge of the tunnel section of the powerboat hull.
Figure 8:
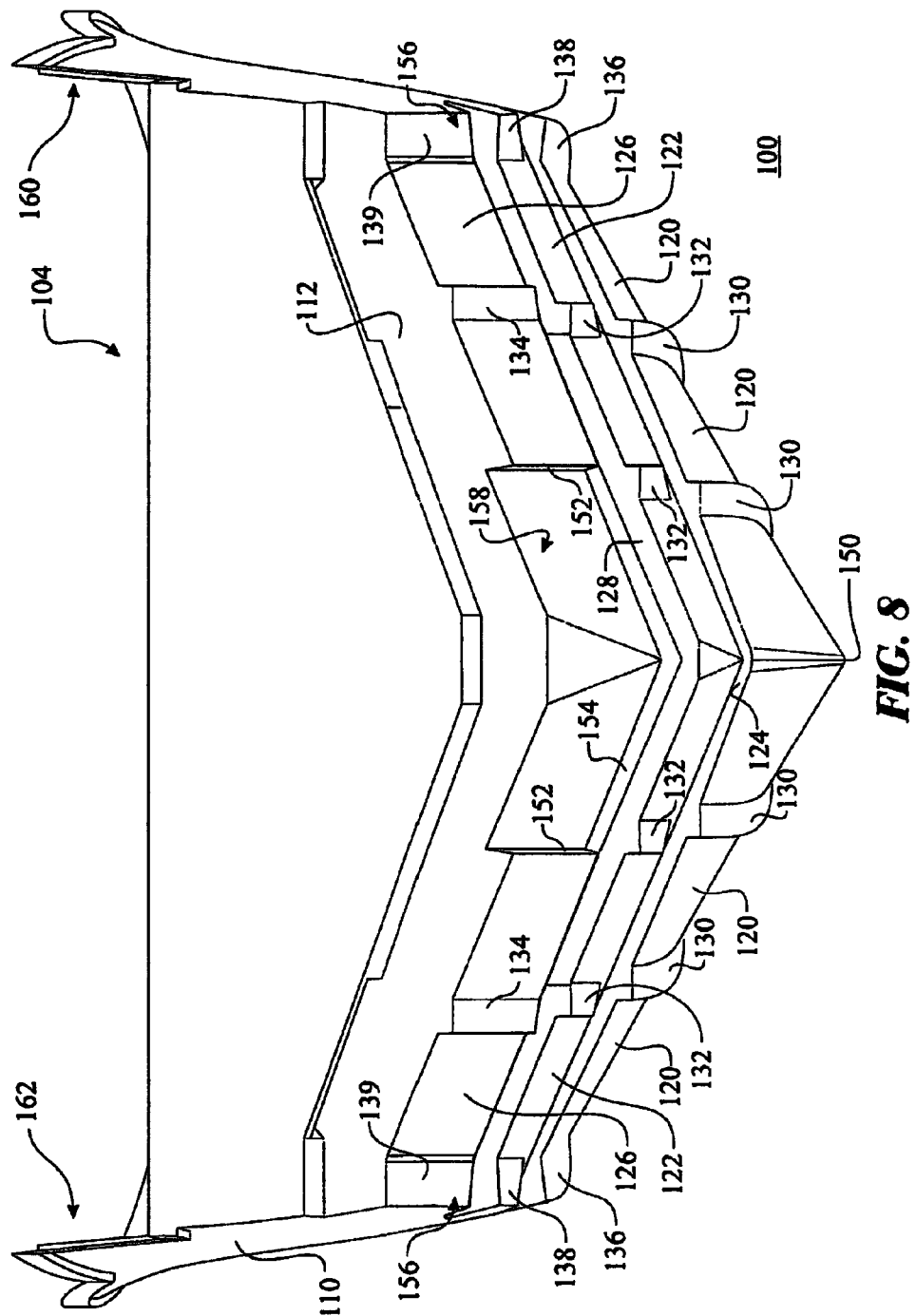
FIG. 8 presents a rear view of the powerboat hull of FIG. 1.

Referring initially to FIGS. 1 through 8, a high speed power boat hull is shown generally as reference numeral 100. A bottom view of the hull 100 is shown in FIG. 1, the illustration presenting an exemplary embodiment of the present invention. An elevation view of the hull 100 is shown in FIG. 2, with a magnified view of the aft section presented in FIG. 3. An isometric view of the bottom of the hull 100 is presented in FIG. 4, with a magnified view of the aft section presented in FIG. 5. A rear view of the hull 100 taken just aft of a transom 112 taken along section 6-6 of FIG. 2 is illustrated in FIG. 6. A sectional view of the hull 100 taken just aft of the leading edge of a ventilated tunnel 150 taken along section 7-7 of FIG. 2 is illustrated in FIG. 7. A rear view of the hull 100 as viewed from behind a motor mount 114 is best shown in FIG. 8.

The exemplary embodiment presents a powerboat hull 100 defined by three primary sections, a bow 102, a stern 104 and a midship 106. The hull 100 comprises a keel 108 oriented longitudinally, spanning between the bow 102 and the stern 104. The keel 108 is generally located along the centerline of the hull 100, being the main central member running along the length of the bottom of the boat. The keel 108 is also considered an important part of the boat's structure. The hull 100 comprising a planing surface and a hull sidewall 110, rising from the planing surface towards a gunwale, or upper longitudinal structural member hull 100 positioned along the top edge of the hull sidewall 110. In the exemplary embodiment, the planing surface comprises a forward hull 120, a forward step hull section 122 and a aft step hull section 126; the forward hull 120 defining a "V" shaped forward hull, the forward step hull section 122 defining a midship's step, and the aft step hull section 126 defining an aft step. The interface between the planing surface and the hull sidewall 110 is referred to as a chine. The term hard chine indicates an angle with little rounding, where a soft chine would be more rounded, but still involve the meeting of distinct planes. Most fiberglass hulls have soft chines. The exemplary embodiment presents a fore edge chine 136, a fore step edge chine 138 and an aft step edge chine 139. A transom 112 is a generally vertical member, oriented perpendicular to the keel 108 at the stern 104 of the hull 100 and spanning between each hull sidewall 110. Generally, the transom 112 is considered as the aft most portion of the hull, understanding a motor mount 114 can optionally project from the transom 112.

Several features are incorporated for improved planing and stability.

A first being a plurality of strakes are positioned longitudinally along the planing surfaces 120, 122, 126 of the hull 100. The strakes are horizontal strips located along the exterior hull 100, running longitudinally along the hull 100 from the stem or bow 102 to the stern 104. The exemplary embodiment divides the strakes into three sections, each section respective to the section of the hull 100. A plurality of fore strakes 130 span between the bow 102 and a fore step hull leading edge 124, a plurality of fore step strakes 132 span between the fore step hull leading edge 124 and a aft step hull leading edge 128, and a plurality of aft step strakes 134 span between the aft step hull leading edge 128 and the transom 112.

A second planing feature being a plurality of stepped hull sections. A midship step is defined by the fore step hull leading edge 124 located along a leading edge, the forward step hull section 122 being offset, positioned above the adjacent section of forward hull 120, sloping downward and spanning aft to the aft step hull leading edge 128. The fore step hull leading edge 124 is a generally vertical wall section projecting upward into the hull 100 forming a fore ventilation channel 140. The fore ventilation channel 140 spans between a starboard 160 and port 162 side of the hull 100, providing a fore ventilation port 142 located at least partially above a planing waterline 118, thus creating a ventilation flow path. An aft step is defined by the aft step hull leading edge 128 located along a leading edge, the aft step hull section 126 being offset, positioned above the adjacent section of forward step hull section 122, sloping downward and spanning aft to the transom 112. The aft step hull leading edge 128 is a generally vertical wall section projecting upward into the hull 100 forming a tunnel ventilation channel 154. The tunnel ventilation channel 154 spans between a starboard 160 and port 162 side of the hull 100, providing a tunnel ventilation port 156 located at least partially above the planing waterline 118, thus creating yet another ventilation flow path.

A third planing feature being a ventilated tunnel 150. The ventilated tunnel 150 is defined as a recession located along the centerline of the hull 100 and spanning longitudinally between the tunnel ventilation channel 154 and the transom 112. A pair of tunnel sidewall 152 is provided as vertical walls that define each outer longitudinal side of the ventilated tunnel 150. The section of the keel 108 disposed along the ventilated tunnel 150 is elevated respective to a linear keel projected from the forward portion of the hull 100. Ventilation of the ventilated tunnel 150 is provided via the tunnel ventilation channel 154 located perpendicular to the ventilated tunnel 150. The ventilated tunnel 150 is preferably of the same depth as the tunnel ventilation channel 154, but can be greater than or less than the depth of the tunnel ventilation channel 154. The ventilated tunnel 150 additionally provides directional stability via the tunnel sidewall 152.

The ventilated tunnel 150 comprising an exemplary tunnel upper surface 158 comprising a "V" shaped forward surface, tapering to a soft "V" shape aft surface. The modified "V" comprising an angled port side, an angled starboard side and a horizontal section between the two angled sides. Alternatively, tunnel upper surface 158 can be completely horizontal, completely "V" shaped" or any other respective shape.

The motor mount 114 can be of any form factor respective to the power plant and drive train or propulsion configuration. The exemplary embodiment illustrated includes an extended form factor of a motor mount 114, generally provided for outboard motors. This form factor provides several inherent advantages, including positioning the motors at a distance from the transom 112. A trim tab clearances 116 can be incorporated into the motor mount 114, providing clearance for trim tabs (not shown). Additionally, it is desirable to position the propulsion component (not shown but well understood is at least partially positioned between the ventilated tunnel sidewalls 152.

Figure 9:
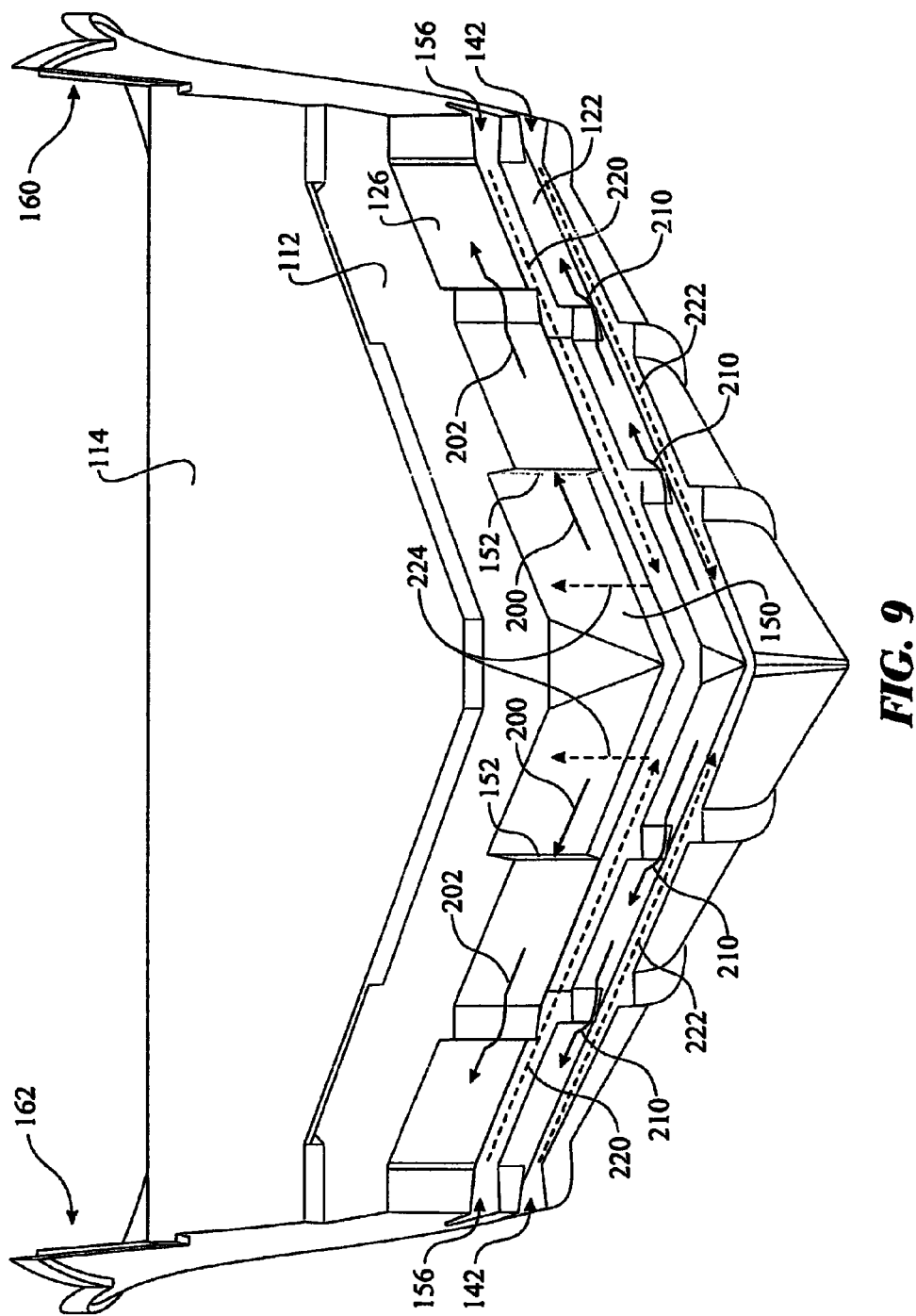
FIG. 9 presents the rear view as presented in FIG. 8, further illustrating how the various lateral forces interact with features of the hull.
Figure 10:
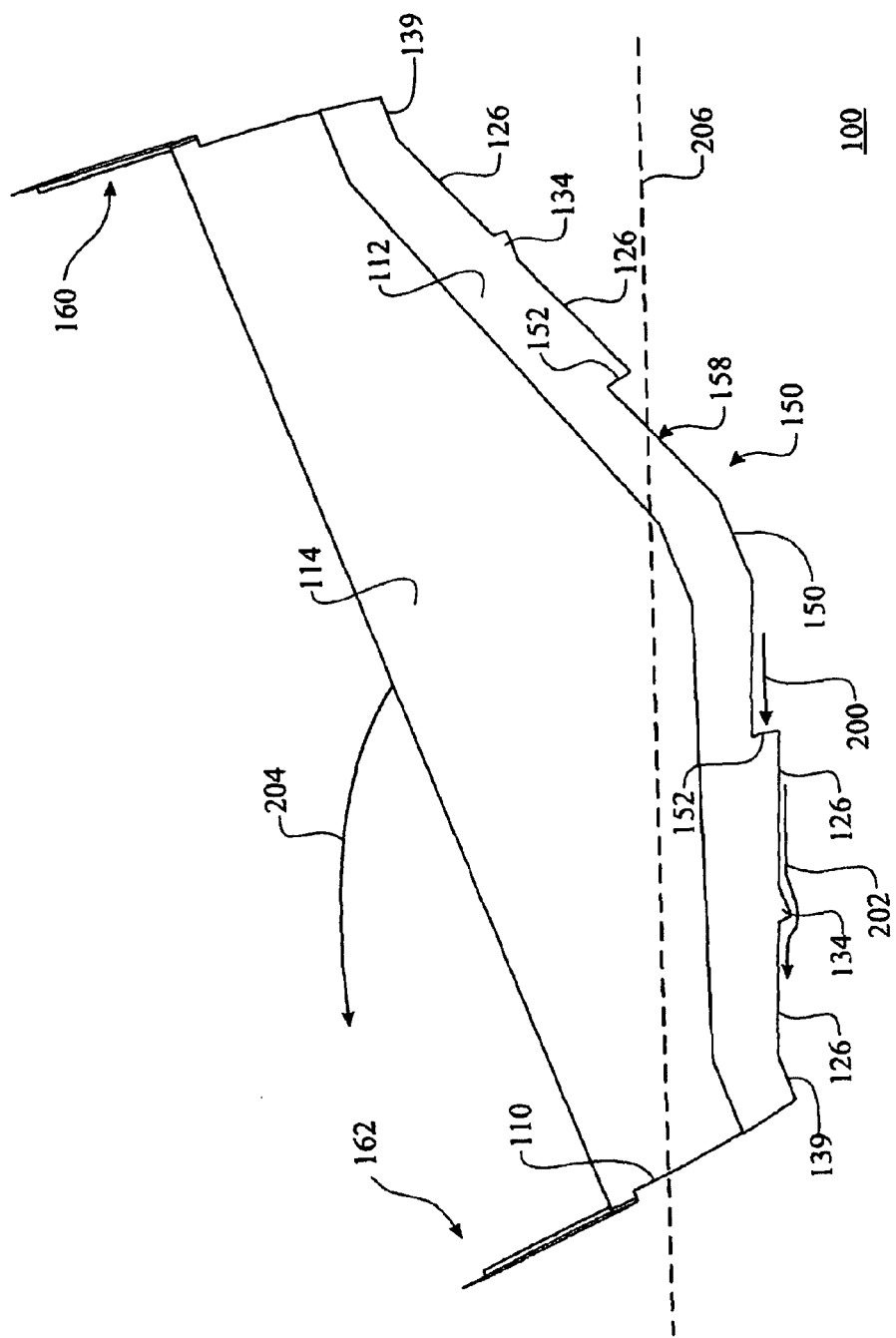
FIG. 10 presents the rear view as presented in FIG. 6, further illustrating how the various lateral forces interact with features of the hull during a high speed turn.

An exemplary diagram presenting the functionality of the present invention is shown in FIGS. 9 and 10. The ventilation flow and flow of water are shown in FIG. 9. The flow of water during a turning motion 204 is shown in FIG. 10.

The ventilation flow is provided via each transverse ventilation channel 140, 154. A step hull ventilation flow 222 enters the fore ventilation port 142 flowing inward along the fore ventilation channel 140 relieving any suction between the forward step hull section 122 and the water. A tunnel transverse ventilation flow 220 enters the tunnel ventilation port 156 flowing inward along the tunnel ventilation channel 154 relieving any suction between the aft step hull section 126 and the water. Additionally, the tunnel transverse ventilation flow 220 flows along a tunnel longitudinal ventilation flow 224 providing lift via the ventilated tunnel 150. The ventilation reduces suction and the respective drag, thus increasing efficiency and speed.

Current hull designs tend to have bow steer in certain sea conditions, wherein the stern spins out in tight turns. This problem is aggravated with the incorporation of stepped hulls, as they reduce the suction between the planing surface of the hull and the water. As the vessel undergoes a turning motion 204, the hull 100 is subjected to lateral flow of water. A lateral flow 202, 210 flows over the aft step strakes 134 and fore step strakes 132 respectively, providing minimal if any directional stability. The ventilated tunnel 150 improves directional stability via the tunnel sidewall 152. As the vessel is turning, a lateral directional force 200 is generated via the lateral flow of water against the tunnel sidewall 152. The result is improved directional stability.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A boat hull comprising:
    a bow, a stern, a midship, a transom, a port sidewall, a starboard sidewall, and an undersurface;
    a V-shaped bow section extending aft from the bow to a first step extending transversely across the undersurface from a port chine to a starboard chine at about midship, the first step vertically offsetting the V-shaped bow section from an aft planing section aft of the V-shaped bow section;
    a ventilation channel spanning between the port and starboard chines, recessed into the undersurface on the aft planing section, and positioned closer to the first step than it is to the transom;
    ventilation ports in fluid communication with the ventilation channel and located at least partially above a planing waterline;
    a second step extending transversely across the undersurface from the port chine to the starboard chine aft of the first step and vertically offsetting the aft planing section from the first step and V-shaped bow section, the second step having a step leading edge defining a forward wall of the ventilation channel, the second step being positioned closer to the first step than it is to the transom;
    a longitudinal ventilation tunnel extending aft out of the ventilation channel and in fluid communication with the ventilation channel and the transom;
    wherein air flows through the ventilation ports to the ventilation channel, continues through the longitudinal ventilation tunnel, and discharges at the transom.

2. The boat hull of claim 1, wherein an upper surface of the ventilation tunnel extends longitudinally along a centerline of the hull to the transom and forms a lowermost portion of the ventilation tunnel when the boat hull is horizontal as if planing across water.

* * * * *